US008979258B2

(12) United States Patent
Usuda (10) Patent No.: US 8,979,258 B2
(45) Date of Patent: Mar. 17, 2015

(54) LIQUID EJECTION DEVICE (75) Inventor: Hidenori Usuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 13/525,742

(22) Filed: Jun. 18, 2012

(65) Prior Publication Data
US 2013/0016164 A1    Jan. 17, 2013

(30) Foreign Application Priority Data

Jul. 12, 2011 (JP) ................................. 2011-154125

(51) Int. Cl.
*B41J 2/01* (2006.01)
*H04N 1/60* (2006.01)
*B41J 11/00* (2006.01)
*G01J 3/52* (2006.01)

(52) U.S. Cl.
CPC ............. *H04N 1/6044* (2013.01); *B41J 11/002* (2013.01); *G01J 3/524* (2013.01)
USPC ........................................................ 347/102

(58) Field of Classification Search
CPC ................................................................ B41J 2/01
USPC ........................................................ 347/102
See application file for complete search history.

(56) References Cited

U.S. PATENT DOCUMENTS

| | | |
|---|---|---|
| 2005/0219298 A1 | 10/2005 | Kachi |
| 2008/0309704 A1 | 12/2008 | Kondo |
| 2009/0231621 A1 | 9/2009 | Kuwahara |
| 2009/0303304 A1* | 12/2009 | Oyanagi et al. ................ 347/100 |
| 2010/0110138 A1* | 5/2010 | Mikuriya ......................... 347/19 |
| 2011/0096132 A1* | 4/2011 | Kobayashi et al. ............ 347/102 |

FOREIGN PATENT DOCUMENTS

JP    2009-220290 A    10/2009

OTHER PUBLICATIONS

The extended European Search Report for European Application No. 12175682.9 mailed May 8, 2014.

* cited by examiner

*Primary Examiner* — Alessandro Amari
*Assistant Examiner* — Alexander C Witkowski
(74) *Attorney, Agent, or Firm* — Global IP Counselors, LLP (57) ABSTRACT

A liquid ejection device has a feeding mechanism, a nozzle, an irradiating section, and a color meter. The feeding mechanism is configured and arranged to feed a medium in a feed direction. The nozzle is configured and arranged to eject a liquid to be cured by irradiation of light toward the medium. The irradiating section is configured and arranged to radiate the light toward the liquid landed on the medium. The color meter is disposed on a downstream side of the feed direction with respect to the irradiating section so as to perform color measurement of an image generated on the medium, the color meter being configured and arranged such that calibration of the color meter is performed by reading a reference. The irradiating section is configured and arranged to radiate the light when the calibration of the color meter is performed.

6 Claims, 10 Drawing Sheets

LIQUID EJECTION DEVICE

CROSS-REFERENCE TO RELATED APPLICATIONS

This application claims priority to Japanese Patent Application No. 2011-154125 filed on Jul. 12, 2011. The entire disclosure of Japanese Patent Application No. 2011-154125 is hereby incorporated herein by reference.

BACKGROUND

1. Technical Field

The present invention relates to a liquid ejection device.

2. Related Art

As an example of a liquid ejection device, a printer for printing an image by ejecting a liquid (such as UV ink) to be cured by irradiation of light (such as UV) is known. Such a printer has a light irradiating section which radiates light toward a liquid (dots) landed on a medium after the liquid is ejected from a nozzle to the medium. In this manner, the dots are cured and fixed to the medium, which makes it possible to perform good printing to a medium that is difficult to absorb a liquid.

Another printer is also known in which a color meter is provided on a downstream side of a feed direction of a medium with respect to a print region so as to perform color measurement of an image generated on the medium (see Japanese Laid-Open Patent Application Publication No. 2009-220290).

SUMMARY

In a case of providing both of the light irradiating section and the color meter as described above, however, it is likely that light radiated from the irradiating section will be reflected on a medium and the like, and will enter the color meter. Then, the color measurement value of the color meter might be changed by the effect of light from the irradiating section. Consequently, the accuracy of the color measurement of the color meter might be deteriorated.

Thus, an object of the present invention is to improve the accuracy of color measurement.

In order to achieve the above-described object, a liquid ejection device according to one aspect of the present invention has a feeding mechanism, a nozzle, an irradiating section, and a color meter. The feeding mechanism is configured and arranged to feed a medium in a feed direction. The nozzle is configured and arranged to eject a liquid to be cured by irradiation of light toward the medium. The irradiating section is configured and arranged to radiate the light toward the liquid landed on the medium. The color meter is disposed on a downstream side of the feed direction with respect to the irradiating section so as to perform color measurement of an image generated on the medium, the color meter being configured and arranged such that calibration of the color meter is performed by reading a reference. The irradiating section is configured and arranged to radiate the light when the calibration of the color meter is performed.

Other aspects of the present invention will be specified by the description of the present specification and the attached drawings.

BRIEF DESCRIPTION OF THE DRAWINGS

Referring now to the attached drawings which form a part of this original disclosure.

DETAILED DESCRIPTION OF EXEMPLARY EMBODIMENTS

The present specification and the attached drawings specify at least the following matter:

A liquid ejection device according to one embodiment has a feeding mechanism, a nozzle, an irradiating section, and a color meter. The feeding mechanism is configured and arranged to feed a medium in a feed direction. The nozzle is configured and arranged to eject a liquid to be cured by irradiation of light toward the medium. The irradiating section is configured and arranged to radiate the light toward the liquid landed on the medium. The color meter is disposed on a downstream side of the feed direction with respect to the irradiating section so as to perform color measurement of an image generated on the medium, the color meter being configured and arranged such that calibration of the color meter is performed by reading a reference. The irradiating section is configured and arranged to radiate the light when the calibration of the color meter is performed.

According to this liquid ejection device, the accuracy of color measurement by a color meter can be improved.

In the liquid ejection device, preferably, the nozzle and the irradiating section are provided in a carriage that can move in a movement direction intersecting with the feed direction, and the irradiating section radiates the light and the calibration of the color meter is performed in a state where the carriage has been moved to a print region.

According to this liquid ejection device, calibration can be performed in the same state as printing.

In the liquid ejection device, preferably, the medium is fed onto the print region by the feeding mechanism when the irradiating section radiates the light.

According to this liquid ejection device, it is further possible to arrange conditions of light reflection and the like to be the same as printing.

In the liquid ejection device, preferably, the feeding mechanism has a bending portion provided between the irradiating section and the color meter so as to bend the medium toward a normal direction of a plane of the medium, and the color meter has a light receiving section provided in a position closer to the medium than a straight line connecting between an irradiation position where the irradiating section radiates the light and the bending portion.

According to this liquid ejection device, it is possible to reduce the effect of light irradiation at the time of color measurement.

In the liquid ejection device, preferably, a speed of printing an image to the medium is smaller and an irradiation intensity of the irradiating section is smaller when the color measurement is performed by the color meter than when the color measurement is not performed.

According to this liquid ejection device, it is possible to reduce the effect of light irradiation at the time of color measurement while maintaining the light irradiation amount to dots.

In the following embodiments, an ink jet printer (hereinafter referred to as the printer 10) will be explained as an example of the liquid ejection device.

First Embodiment

Hereinafter, the printer 10 of the present embodiment will be explained. The printer 10 of the present embodiment is a printer for printing to a large-sized medium (for example, paper having a size of A2 or larger according to the Japanese Industrial Standard). The printer 10 of the present embodiment prints an image to a medium by ejecting UV curable ink (hereinafter, UV ink), as an example of a liquid, to be cured when irradiated with ultraviolet rays (hereinafter, UV) that is one type of light. UV ink is ink that contains UV curable resin, and when irradiated with UV, a photopolymerization reaction occurs in the UV curable resin, which causes the UV ink to cure. The printer 10 of the present embodiment prints an image by using UV ink of four colors of CMYK. In the following explanation, the lower side refers to a side where the printer 10 is installed, and the upper side refers to a side apart from the side where the printer 10 is installed. Also, the paper feeding side (back end side) refers to a side where paper P is fed, and the paper discharge side (front end side) refers to a side where paper P is discharged.

Configuration of Printer

Figure 1:
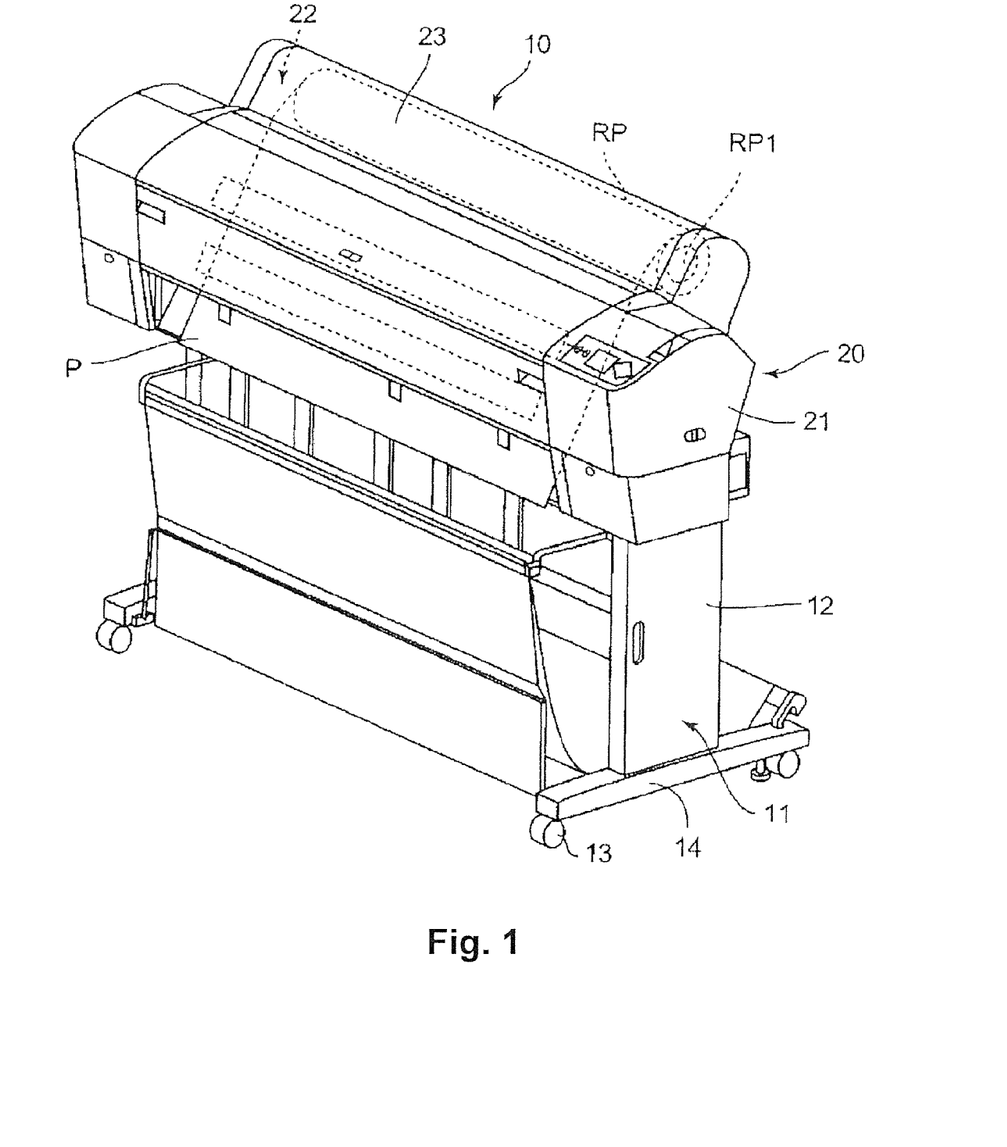
FIG. 1 is a view showing a configuration example of the appearance of a printer 10 according to an embodiment of the present invention.
Figure 2:
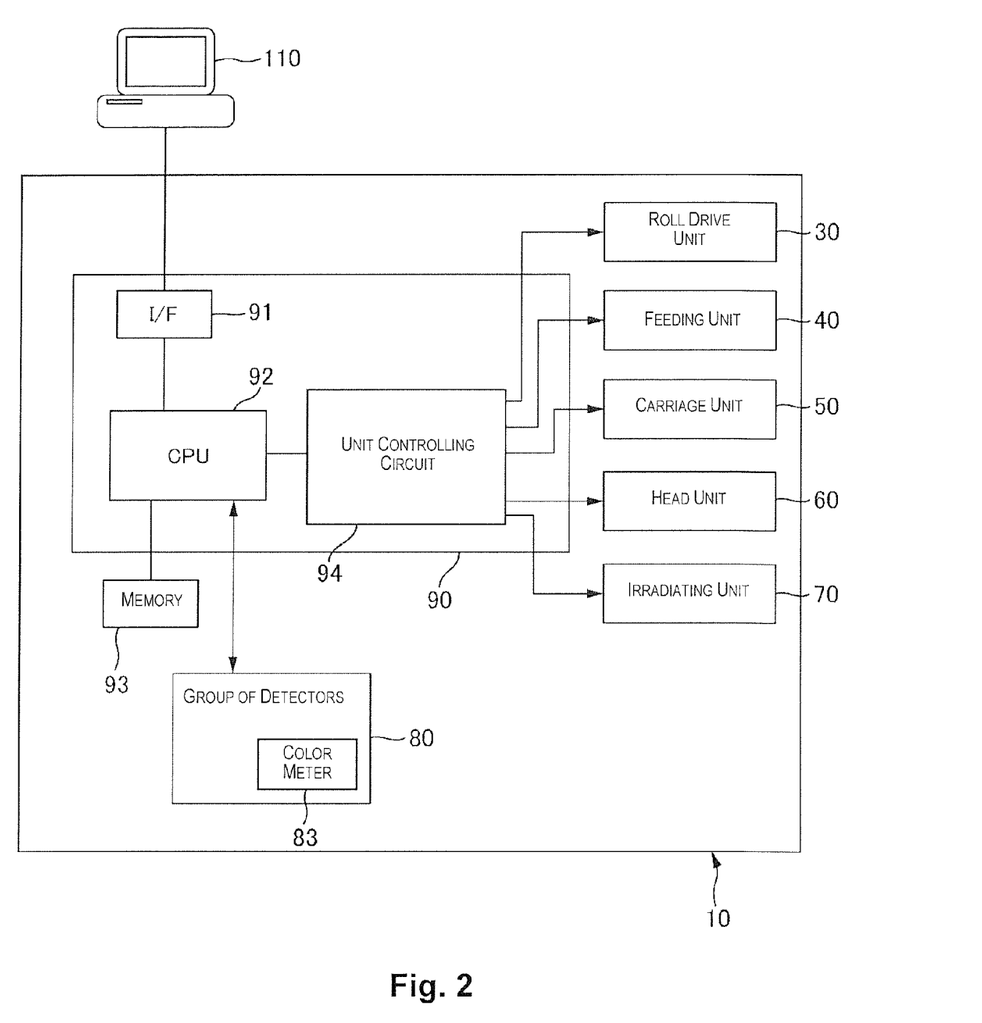
FIG. 2 is a block diagram showing a configuration of the printer 10.
Figure 3:
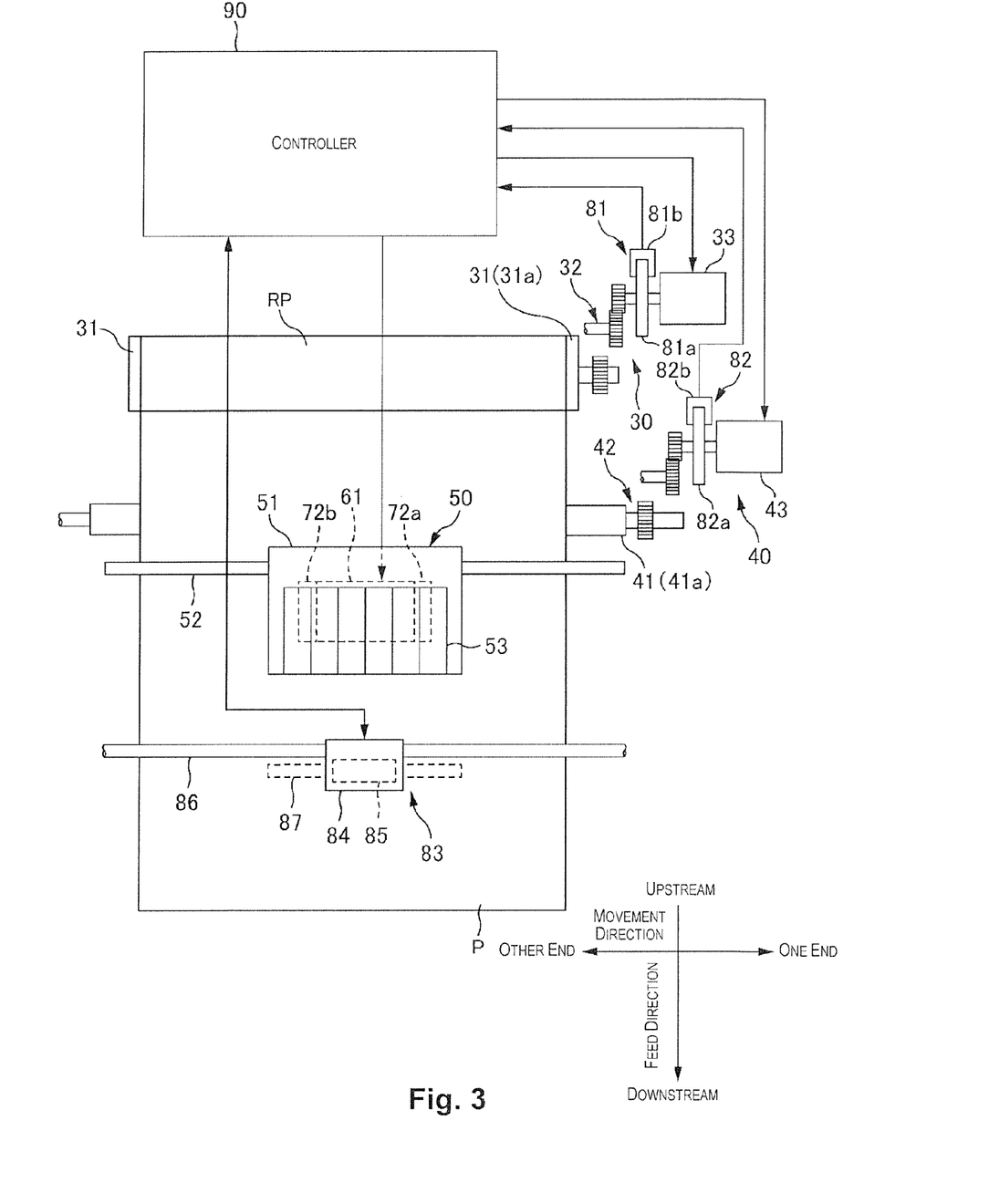
FIG. 3 is a diagram showing a relationship between a drive system and a control system of the printer 10.
Figure 4:
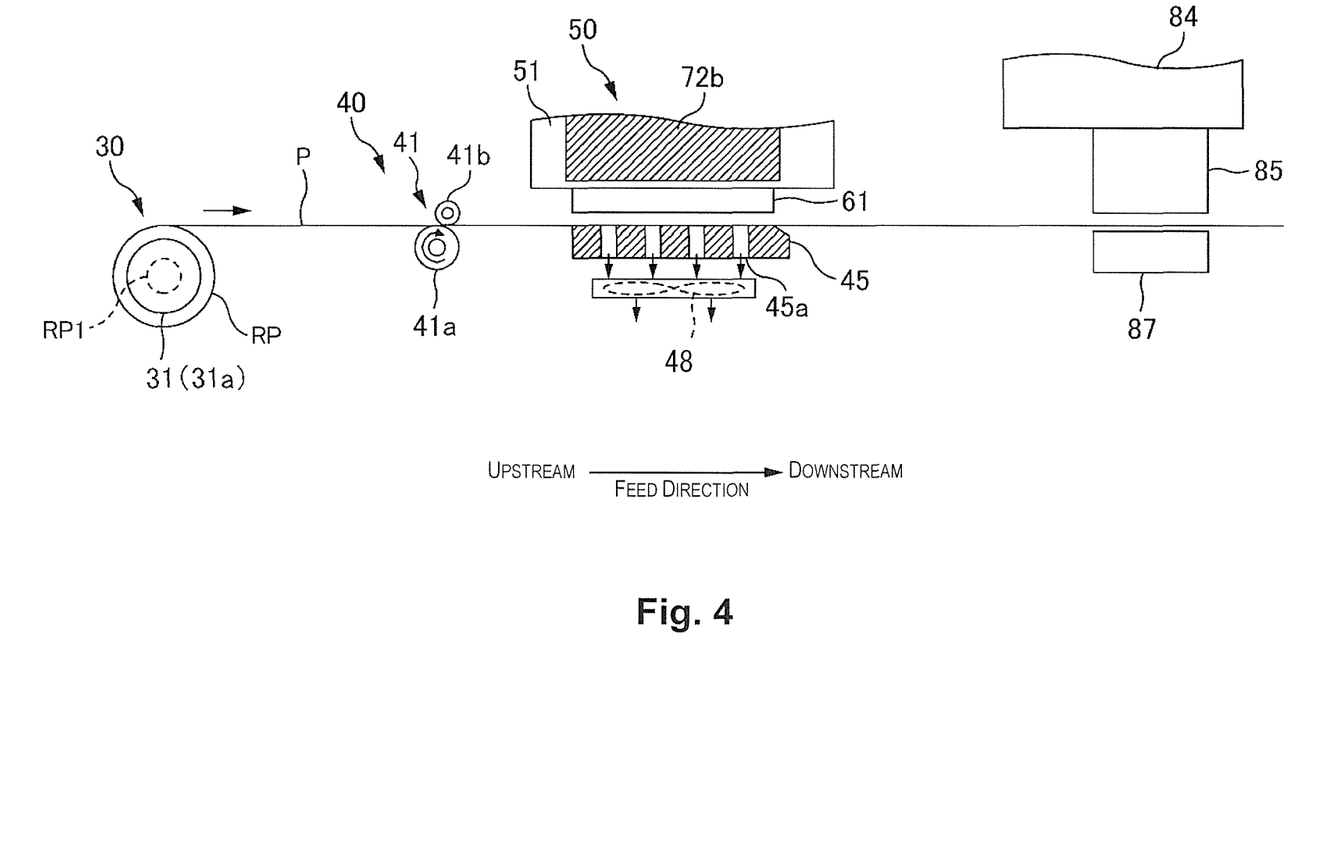
FIG. 4 is a schematic diagram of a configuration of a feeding route seen from a lateral view.

FIG. 1 is a view showing a configuration example of the appearance of a printer 10 according to an embodiment of the present invention. FIG. 2 is a block diagram showing a configuration of the printer 10. FIG. 3 is a diagram showing a relationship between a drive system and a control system of the printer 10. FIG. 4 is a schematic diagram of a configuration of a feeding route seen from a lateral view.

As shown in FIG. 1, the printer 10 of the present embodiment has a pair of leg portions 11, and a main body portion 20 supported by the leg portions 11. The leg portion 11 is provided with a post 12, and a rotatable caster 13 is attached to a caster supporting portion 14.

In the main body portion 20, various internal devices are installed in a state of being supported by a chassis that is not shown in the drawing, and the internal devices are covered by an external case 21. As shown in FIG. 2, the main body portion 20 of the printer 10 is provided with a roll drive unit 30, a feeding unit 40, a carriage unit 50, a head unit 60, an irradiating unit 70, a group of detectors 80 and a controller 90. When the printer 10 receives print data from a computer 110 as an external device, the printer 10 controls each unit (the roll drive unit 30, the feeding unit 40, the carriage unit 50, the head unit 60, and the irradiating unit 70) by the controller 90, and prints an image to a medium. The status inside the printer 10 is monitored by the group of detectors 80, and the group of detectors 80 outputs detection results to the controller 90. The controller 90 controls each unit based on the detection results output from the group of detectors 80.

The roll drive unit 30 is provided on a roll installation portion 22 of the main body portion 20 so as to rotate a roll body RP. As shown in FIG. 1, the roll installation portion 22 is positioned on a back and upper side of the main body portion 20. By opening an open-close lid 23 that is a part of the above-described external case 21, a roll body RP can be installed inside the roll installation portion 22, and the roll body RP can be rotated and driven by the roll drive unit 30.

Figure 5:
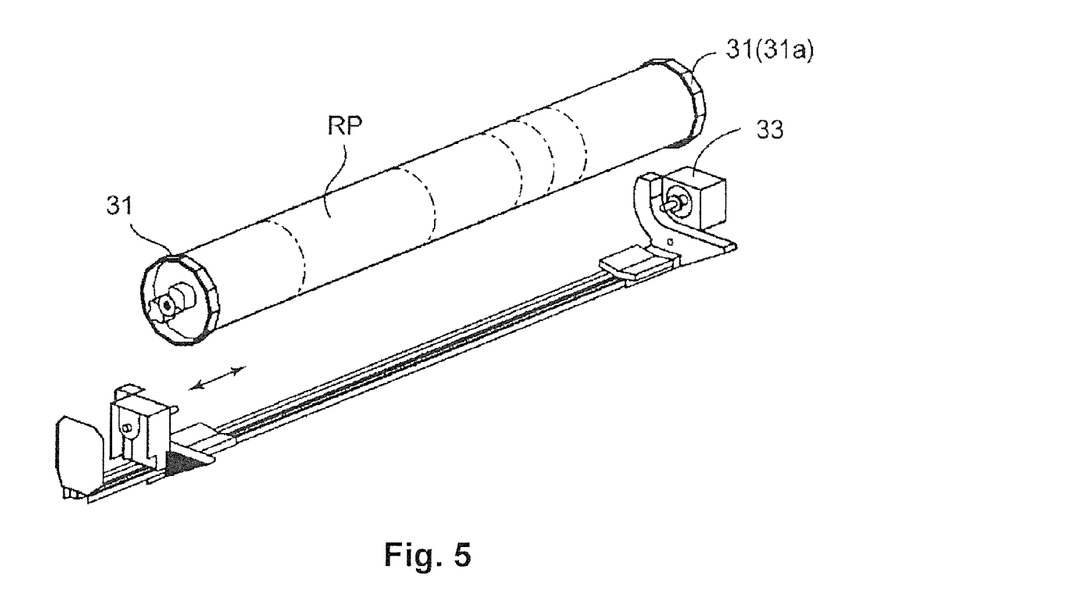
FIG. 5 is a view showing a configuration example of the appearance of a rotating holder 31 and a roll motor 33.

As shown in FIG. 3 and FIG. 5, the roll drive unit 30 has a rotating holder 31, a gear train 32, and a roll motor 33. FIG. 5 is a view showing a configuration example of the appearance of the rotating holder 31 and the roll motor 33.

The rotating holder 31 is inserted from both ends of a hollow hole RP1 formed in a roll body RP, and more specifically a pair of rotating holders 31 are provided to support a roll body RP from the both ends thereof.

The roll motor 33 gives a driving force (rotating force) to a rotating holder 31a, which is one of the pair of rotating holders 31 located on one end, by the gear train 32.

The feeding unit 40 feeds a medium (for example, paper) in a predetermined direction (hereinafter referred to as feed direction). As shown in FIG. 3, FIG. 4, and the like, the feeding unit 40 has a pair of feeding rollers 41, a gear train 42, and a PF motor 43.

The pair of feeding rollers 41 consist of a feeding roller 41a and a driven roller 41b, which can sandwich paper P (roll paper) drawn from a roll body RP therebetween.

The PF motor 43 gives a driving force (rotating force) to the feeding holder 41a by the gear train 42.

As shown in FIG. 4, a platen 45 is provided on the downstream side (paper discharge side) with respect to the pair of feeding rollers 41, and paper P is guided onto the platen 45. A head 61 is provided to face the platen 45. A suction hole 45a is formed in the platen 45. The suction hole 45a is formed so as to lead to a suction fan 48, and air is suctioned from the head 61 side through the suction hole 45a by operating the suction fan 48. Consequently, if paper P exists on the platen 45, the paper P can be retained by suction.

The carriage unit 50 causes the head 61 to move (also called as "scan") in a direction intersecting with the feed direction (hereinafter referred to as movement direction). The carriage unit 50 of the present embodiment has a carriage 51 and a carriage shaft 52. The carriage unit 50 of the present embodiment also has a carriage motor, a belt, and the like, but these are not shown in the drawings.

The carriage 51 has an ink tank 53 as a reservoir of ink (UV ink) of each color. Ink can be supplied from an ink cartridge (not shown in the drawing) fixedly-provided on a front side of the main body portion 20 to the ink tank 53 through a tube that is not shown in the drawing. As shown in FIG. 3 and FIG. 4, the head 61 is provided in the lower surface of the carriage 51 so as to eject ink drops.

The head unit 60 ejects ink (UV ink in this embodiment) to a medium. The head unit 60 is provided with the head 61 having a plurality of nozzles. A piezoelectric element, which is not shown in the drawing, is provided corresponding to each nozzle of the head 61. Ink drops can be ejected from the nozzle by operation of the piezoelectric element. The configuration of the head 61 will be described in detail later.

Since the head 61 is provided in the carriage 51, when the carriage 51 is moved in the movement direction, the head 61 is also moved in the movement direction. Then, the head 61 continuously ejects UV ink while moving in the movement direction, and thereby forms a dot line (raster line) along the movement direction on a medium.

The irradiating unit 70 irradiates UV ink landed on the medium with UV. Dots formed on the medium are cured by irradiation of the UV from the irradiating unit 70. The irradiating unit 70 of the present embodiment has two irradiating sections (irradiating sections 72a and 72b). Since the irradiating sections 72a and 72b are provided in the carriage 51, when the carriage 51 is moved in the movement direction, the irradiating sections 72a and 72b are also moved in the movement direction. The irradiating sections 72a and 72b radiate UV while moving. The irradiating sections 72a and 72b will be described in detail later.

The group of detectors 80 has a rotation detecting section 81, a rotation detecting section 82, and a color meter 83. The rotation detecting section 81 detects a rotation status of the roll motor 33, and the rotation detecting section 82 detects a rotation status of the PF motor 43. The rotation detecting section 81 and the rotation detecting section 82 use a rotary encoder, respectively. For example, the rotation detecting section 81 has a disc-shaped scale 81a and a rotary sensor 81b. The disc-shaped scale 81a has a light transmitting section for transmitting light and a light shielding section for shielding transmission of light which are provided at a predetermined interval along the circumferential direction of the disc-shaped scale 81a. The rotary sensor 81b has a light emitting element, a light receiving element, and a signal processing circuit as main components. The light emitting element, the light receiving element, and the signal processing circuit are not shown in the drawing.

Figure 6A:
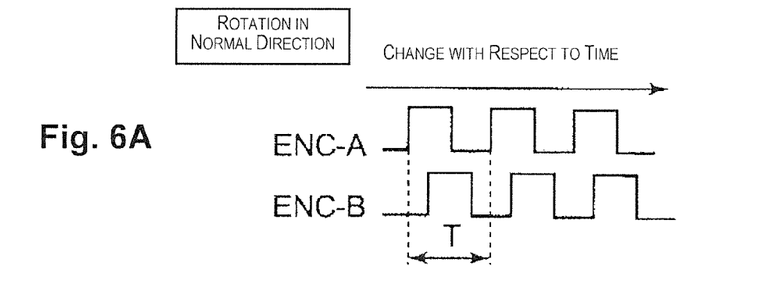
FIG. 6A is a timing chart of waveforms of output signals when the roll motor 33 rotates in a normal direction and FIG. 6B is a timing chart of waveforms of output signals when the roll motor 33 rotates in a reverse direction.
Figure 6B:
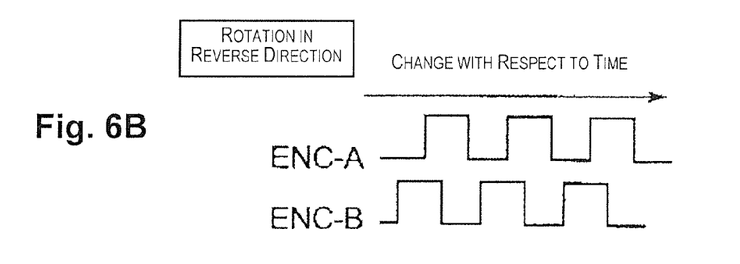

FIG. 6A is a timing chart of waveforms of output signals when the roll motor 33 rotates in a normal direction. FIG. 6B is a timing chart of waveforms of output signals when the roll motor 33 rotates in a reverse direction. In the present embodiment, pulse signals (ENC signal of A phase and ENC signals of B phase) whose phases are different by 90 degrees as shown in FIG. 6A and FIG. 6B are input to the controller 90 by output from the rotary sensor 81b. From these pulse signals, it is possible to detect whether the roll motor 33 is in a normal rotation state or in a reverse rotation state based on the progress/delay of the phase.

The rotation detecting section 82 has a disc-shaped scale 82a and a rotary sensor 82b. Since each component of the rotation detecting section 82 and the detecting operation for rotation of the PF motor 43 by the rotation detecting section 82 are the same as the rotation detecting section 81, these will not be explained.

The color meter 83 measures the color of an image generated on paper P such as a pattern for color measurement. As shown in FIG. 3 and FIG. 4, the color meter 83 is provided on the downstream side of the feed direction with respect to the carriage 51, the head 61 of the carriage 51, and the irradiating sections 72a and 72b. In other words, the color meter 83 is provided on the downstream side of the feed direction with respect to the print region of the printer 10. The color meter 83 performs color measurement of an image generated on paper P, and outputs an obtained color measurement value (color measurement results) to the controller 90. The color meter will be described in detail later.

The group of detectors 80 has a linear-type encoder, a paper detecting sensor, an optical sensor, and the like, although these are not shown in the drawing. The linear-type encoder detects the position of the carriage 51 in the movement direction. The paper detecting sensor detects the tip end of paper P that is being fed. The optical sensor detects whether or not paper P exists by a light emitting section and a light receiving section which are attached to the carriage 51. Further, the optical sensor can detect the position of the ends of the paper P while moving by the carriage 51, and thus can detect the width of the paper P.

The controller 90 is a controlling unit (controlling section) for performing control of the printer 10. As shown in FIG. 2, the controller 90 has an interface section 91, a CPU 92, a memory 93, and a unit controlling circuit 94. The interface section 91 transmits and receives data between the computer 110 as an external device and the printer 10. The CPU 92 is an arithmetic processing device that controls the entire printer 10. The memory 93 secures an area for storing a program of the CPU 92 or secures a work area, and has a memory element such as RAM or EEPROM. The CPU 92 controls each unit trough the unit controlling circuit 94 in accordance with the program stored in the memory 93.

At the time of printing, the controller 90 prints an image constructed by a plurality of dots to paper by alternately repeating a dot forming operation that ejects UV ink from the head 61 moving in the movement direction and a feeding operation that feeds paper in the feed direction as described below. This dot forming operation is also called as "pass". At the time of pass, dots (UV ink) are cured by irradiation of UV from each irradiating section as described below.

Configuration of Vicinity of Head

Figure 7:
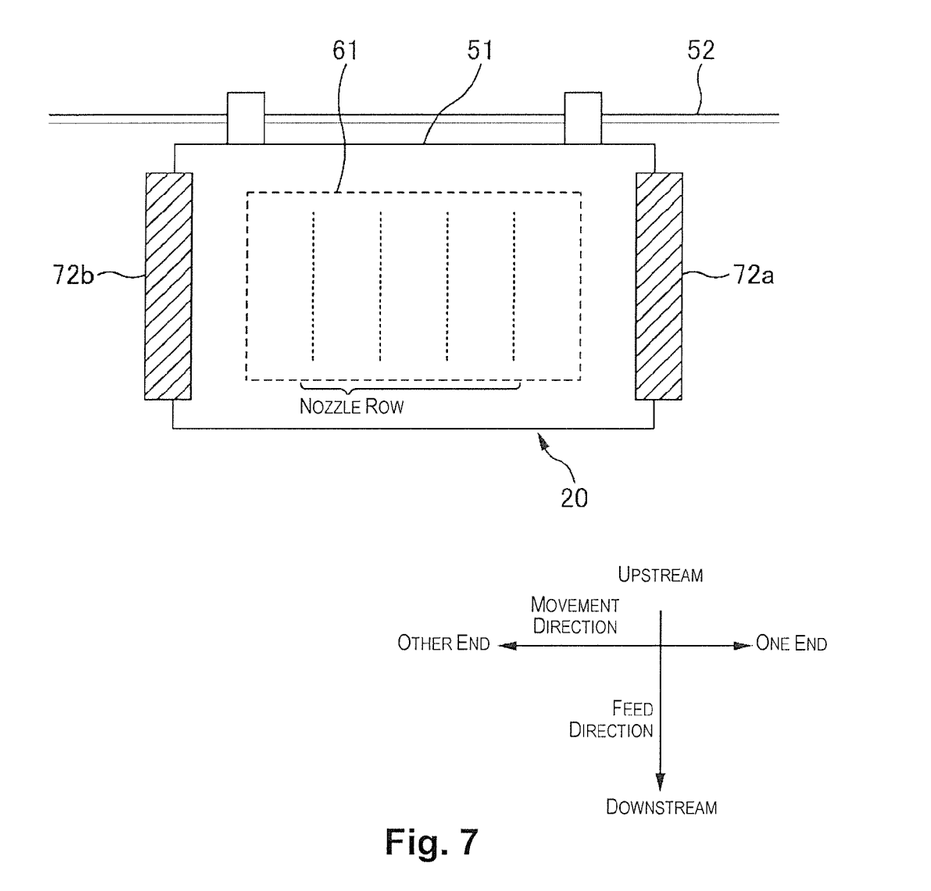
FIG. 7 is a schematic diagram of the vicinity of a head of the printer 10.

FIG. 7 is a schematic diagram of the vicinity of the head of the printer 10. As shown in FIG. 7, the irradiating sections 72a and 72b are respectively provided on one end and the other end of the carriage 51 in the movement direction so as to sandwich the head 61 therebetween. The length of the irradiating sections 72a and 72b in the feed direction is nearly identical to the length of rows of nozzles of the head 61. In other words, the irradiating sections 72a and 72b are provided in a position to be lined with the rows of nozzles in the movement direction. The irradiating sections 72a and 72b radiates UV in an area where the row of nozzles of the head 61 forms dots by moving together with the head 61. The irradiating sections 72a and 72b of the present embodiment has a light emitting diode (LED) as a light source of UV irradiation. LEDs can easily change the irradiation energy by controlling the magnitude of input current. However, the light source of UV irradiation is not limited to an LED, and for example, a lamp can be used.

Figure 8:
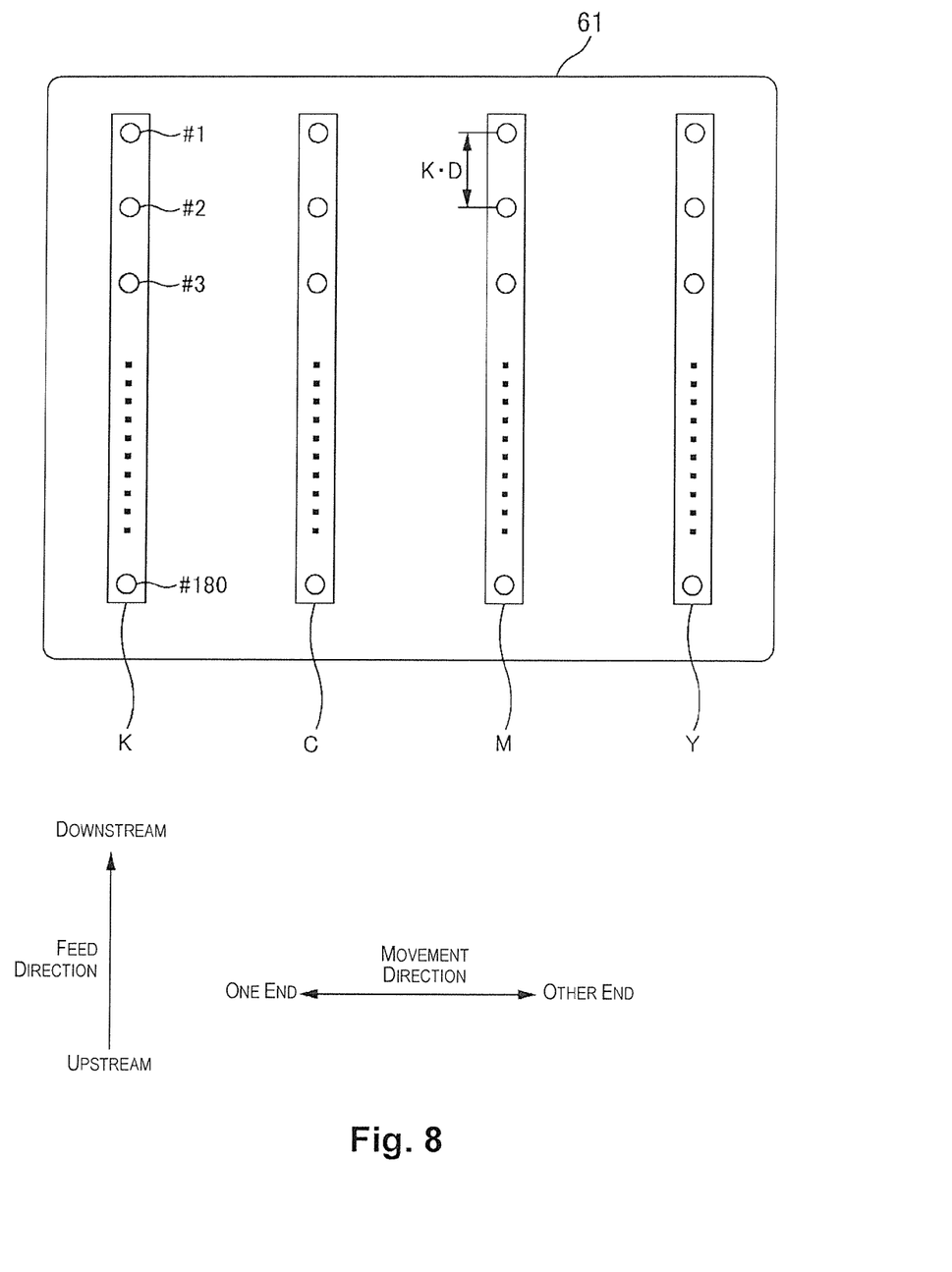
FIG. 8 is a diagram explaining an example of a configuration of a head 61.

FIG. 8 is a diagram explaining an example of the configuration of the head 61. As shown in FIG. 8, a row K of black ink nozzles, a row C of cyan ink nozzles, a row M of magenta ink nozzles, and a row Y of yellow ink nozzles are formed in a lower surface of the head 61. Each row of nozzles has a plurality of nozzles (180 in the present embodiment) as an ejection outlet for ejecting UV ink of each color.

The plurality of nozzles of each nozzle row are aligned at a predetermined interval (nozzle pitch: k•D) along the feed direction. "D" is a minimum dot pitch in the feed direction (that is, the interval of dots formed on a medium at maximum resolution). "k" is an integer of 1 or more. For example, "k" is 4 in a case where the nozzle pitch is 180 dpi (1/180 inch) and the dot pitch in the feed direction is 720 dpi (1/720 inch).

Numbers are assigned to the nozzles of each nozzle row such that the numbers become smaller as one proceeds toward a downstream side of the feed direction. Each nozzle has a piezoelectric element (not shown in the drawing) as a drive element for causing each nozzle to eject UV ink. Drop-shaped UV ink is ejected from each nozzle by driving the piezoelectric element with a drive signal. The ejected UV ink lands on a medium, and forms dots.

Print Procedure

The controller 90 causes each unit of the printer 10 to perform the following process so as to perform printing of print data received from the computer 110. Prior to the following process, a roll body RP is mounted on the roll installation portion 22, and at least the tip end of paper P is sent out from the roll body RP to the position of the pair of feeding rollers 41.

The controller 90 rotates the feeding roller 41a by rotating the PF motor 43 in a normal direction. When the feeding roller 41a is rotated in a predetermined amount of rotation, paper P is fed in a predetermined amount of feeding along the feed direction. In this instance, it may be possible to control driving of the roll motor 33 so as to adjust tension (tensile force) of paper P between the roll body RP and the pair of feeding rollers 41. For example, when the roll motor 33 is rotated in a reverse direction, looseness of paper P between the roll body RP and the pair of feeding rollers 41 can be eliminated. When the roll motor 33 is rotated in a normal direction, the feeding roller 41a can easily feed paper P. This can be said for the following operation.

When paper P is fed to the lower portion (print region) of the head 61, the controller 90 stops feeding the paper P, and rotates a carriage motor (not shown in the drawing). The carriage 51 moves in the movement direction corresponding to the rotation of the carriage motor. Further, the head 61 and the irradiating sections 72a and 72b, provided in the carriage 51, simultaneously move in the movement direction corresponding to the movement of the carriage 51. The controller 90 causes the head 61 to continuously eject ink drops while the head 61 is moving in the movement direction. The ink drops land on the paper P, resulting in formation of dot rows in which a plurality of dots are aligned in the movement direction.

The controller 90 causes the irradiating sections (the irradiating section 72a or 72b) on the downstream side of the movement direction to perform UV irradiation. The dots formed on the paper P are cured by this UV irradiation while the head 61 is moving.

The controller 90 drives the PF motor 43 while the head 61 is moving back and forth. The PF motor 43 generates a driving force in the rotation direction based on the drive amount commanded by the controller 90. The PF motor 43 rotates the feeding roller 41a by using the driving force. When the feeding roller 41a is rotated in a predetermined amount of rotation, paper P is fed in a predetermined amount of feed. In sum, the feed amount of paper P is determined by the rotation amount of the feeding roller 41a.

In this manner, the controller 90 forms dots on each pixel of paper P by alternately repeating a dot forming operation (and UV irradiation) through the reciprocating movement of the head 61 and a feeding operation that feeds paper P in the feed direction. As described below, the controller 90 causes the color meter 83 to perform color measurement of an image already formed on paper P at the time of the dot forming operation (pass).

Color Meter

As shown in FIG. 3 and FIG. 4, the color meter 83 of the present embodiment has a color meter carriage 84, a color measurement head 85, a rail 86, and a backing 87.

The color meter carriage 84 has a motor that is not shown in the drawing, moves on the rail 86, and causes the color measurement head 85 to move in a main scanning direction (movement direction).

The color measurement head 85 has a light emitting section and a light receiving section in a surface that faces paper P. The light emitting section and the light receiving section are not shown in the drawing. An image formed on the paper P is irradiated with light from the light emitting section, and light reflected on the paper P is received by the light receiving section. Based on this, the color meter 83 measures color information and obtains a correction value and the like for color proof.

The rail 86 moves the color meter carriage 84 to the movement direction (main scanning direction).

The backing 87 is used for calibration of the color meter 83, and is constructed by a white plate-like member. In order to measure the color of an image formed on paper P, the color measurement is performed by causing the color measurement head 85 to scan paper P on the backing 87.

Calibration

When color information of an image is read by the color meter 83, the color measurement value might be displaced due to the environment (such as lightness around the printer 10). In order to address this, the color meter 83 is arranged to read a reference (the white color of the baking 87 in the present embodiment), and confirm whether the value is appropriate or not. In a case where the value has been displaced, an image reading operation is started after adjusting the reference value to be output. This procedure is called as calibration. In the present embodiment, calibration is performed before printing to paper P (that is, before color measurement).

Effect of Light Irradiation at Time of Color Measurement

In the printer 10 of the present embodiment, the carriage 51 and the color meter 83 are lined in the feed direction. This makes it possible to perform a dot formation operation (pass) to paper P and color measurement of an image already formed on a medium at the same time. As described above, the color meter 83 performs color measurement by emitting light from the light emitting section and receiving light reflected on paper P by the light receiving section. However, since UV radiated by the irradiating sections 72a and 72b is one type of light, UV irradiation by each irradiating section might negatively affect color measurement by the color meter 83.

Specifically, it is likely that UV radiated from the irradiating section 72a (or 72b) at the time of printing (at the time of pass) will be reflected on a surface of paper P and the like, and will enter the light receiving section of the color measurement head 85. In such a case, the accuracy of color measurement by the color meter 83 is deteriorated, and thus an accurate measurement value cannot be obtained.

Figure 9:
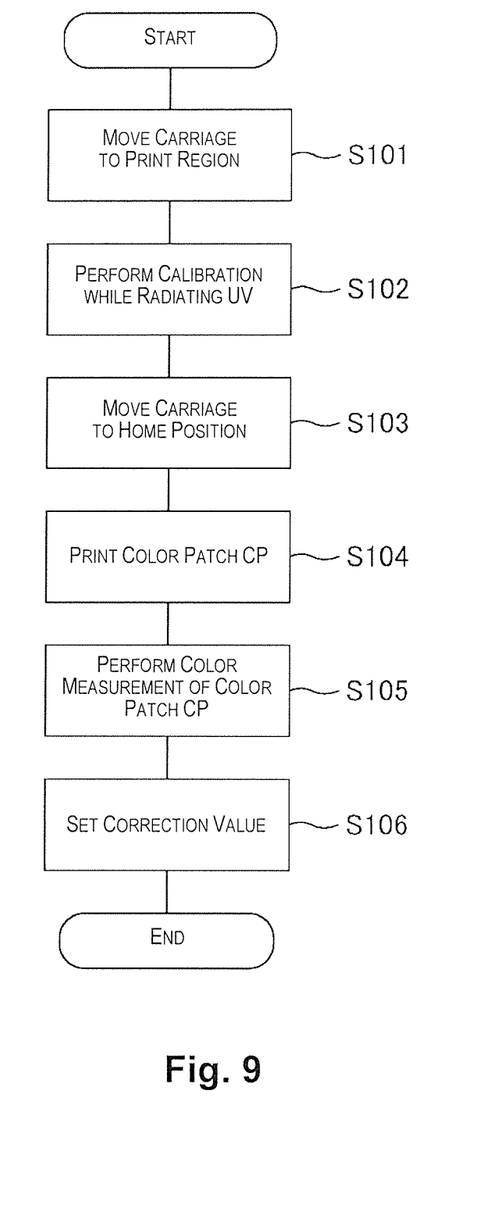
FIG. 9 is a flow diagram of a color measurement operation.

FIG. 9 is a flow diagram of a color measurement operation. Specifically, FIG. 9 shows a flow of setting a correction value by using a pattern for color measurement (hereinafter, also referred to as "color patch CP").

First, the controller 90 causes paper P to be fed to the front of the backing 87, stop there, and then causes the carriage 51 to move to a print region (S101). Preferably, the tip end of paper P is fed onto the platen 45 (that is, onto the print region). This is because the UV conditions (such as reflection conditions) are kept to be equal to ones at the time of actual printing.

Next, the controller 90 causes the color measurement head 85 of the color meter 83 to read the white reference of the backing 87 and carries out calibration of the color meter 83 while causing the irradiating section 72a (or 72b) of the carriage 51 to radiate UV (S102). Specifically, calibration of the color meter 83 is performed in a state where UV is radiated from the irradiating section 72a (or 72b).

When the calibration is finished, the controller 90 moves the carriage 51 to a home position (HP) (S103). Then, the controller 90 carries out the above-described print process, and forms an image (here, color patch CP) to paper P (S104). Also, the controller 90 causes the color meter 83 to perform color measurement of color patch CP that has already been printed (S105). Then, a correction value for the printer 10 is set based on the obtained color measurement value (S106).

In this manner, according to the present embodiment, calibration of the color meter 83 is performed while radiating UV from the irradiating section 72a (or 72b). Consequently, it is possible to prevent the accuracy in the color measurement value from being deteriorated due to the UV irradiation.

Even at the time of normal printing, in order to perform color measurement, the controller 90 moves the carriage 51 to the movement direction in the print region and carries out image generation (dot formation and UV irradiation). At the same time, the controller 90 causes the color meter 83 located on the downstream side of the feed direction with respect to the print region to perform color measurement of an image formed on paper P. In this manner, according to the present embodiment, it is possible to simultaneously perform image printing by ejecting UV ink from the head 61 and color measurement of an image that has already been printed. It is thus possible to efficiently perform image printing and color measurement.

As described above, according to the present embodiment, the carriage 51 is moved to the print region at the time of calibration of the color meter 83, so that UV is radiated from the irradiating section 72a (or 72b) in the same manner as printing. This makes it possible to perform calibration of the color meter 83 in the same state as printing, and reflect the effect of the UV irradiation on the color measurement value to a correction value and the like. Consequently, the accuracy of color measurement by the color meter 83 can be improved.

Second Embodiment

In the second embodiment, the accuracy of color measurement is improved by further eliminating the effect of UV irradiation at the time of the color measurement. In the second embodiment, UV irradiation is performed at the time of calibration in the same manner as the first embodiment. Also, the configuration of the second embodiment that is the same as one of the first embodiment has the same reference numbers, and will not be explained.

Figure 10:
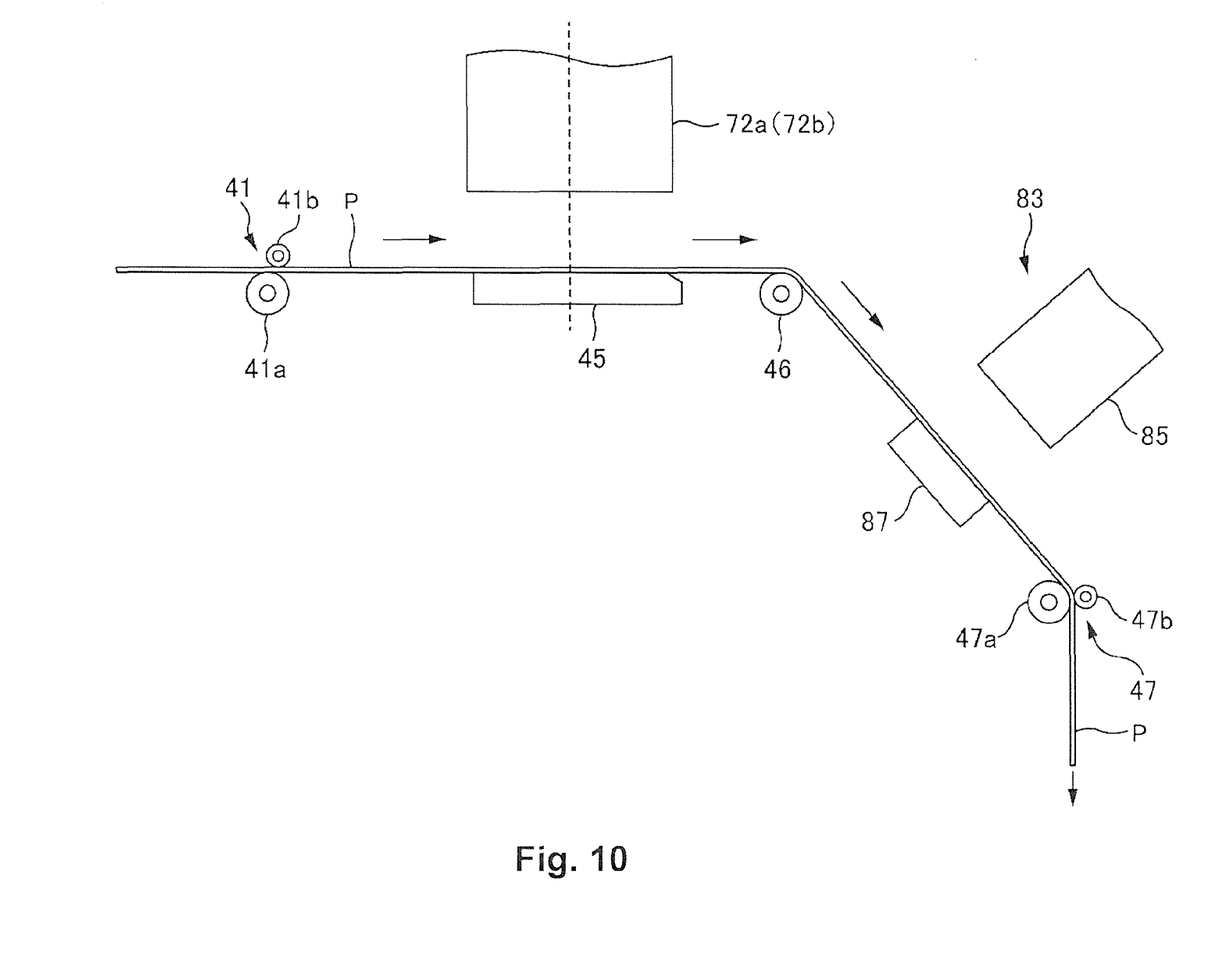
FIG. 10 is a diagram explaining a state of feeding paper P in a second embodiment.

FIG. 10 is a diagram explaining a state of feeding paper P in the second embodiment. As shown in the drawing, the printer 10 of the second embodiment has a bending roller 46 and a pair of paper discharge rollers 47.

The bending roller 46 is a roller for bending paper P toward a normal direction of the platen 45 (direction shown by the dotted line in the drawing). The direction of paper P in the feed direction is changed by the bending roller 46. As shown in FIG. 10, the bending roller 46 is positioned between the platen 45 (that is, the print region) and the color meter 83 (the color measurement head 85) in the feeding route.

The pair of paper discharge rollers 47 has a paper discharge roller 47a, and a driven roller 47b rotated in accordance with the paper discharge roller 47a. The pair of paper discharge rollers 47 are provided on a downstream side of the feed direction with respect to the color meter 83 (the color measurement head 85). The pair of paper discharge rollers 47 are positioned such that the distance between the pair of paper discharge rollers 47 and the irradiating section 72a (or 72b) in the direction of the dotted line in the drawing (normal direction) is greater than the distance between the bending roller 46 and the irradiating section 72a (or 72b). Specifically, the pair of paper discharge rollers 47 are positioned in the lower portion of the drawing. In this manner, paper P is bent toward the normal direction (direction of the dotted line) by the bending roller 46, and the feed direction of the paper P is changed accordingly. The paper discharge roller 47a is controlled by the controller 90 so as to rotate in synchronization with the feeding roller 41a.

In the second embodiment, as shown in the drawing, paper P existing between the bending roller 46 and the pair of paper discharge rollers 47 is fed in a changed feed direction (obliquely). Therefore, each part of the color meter 83 (the color measurement head 85, the backing 87, etc.) is positioned corresponding to the changed feed direction (obliquely).

Figure 11:
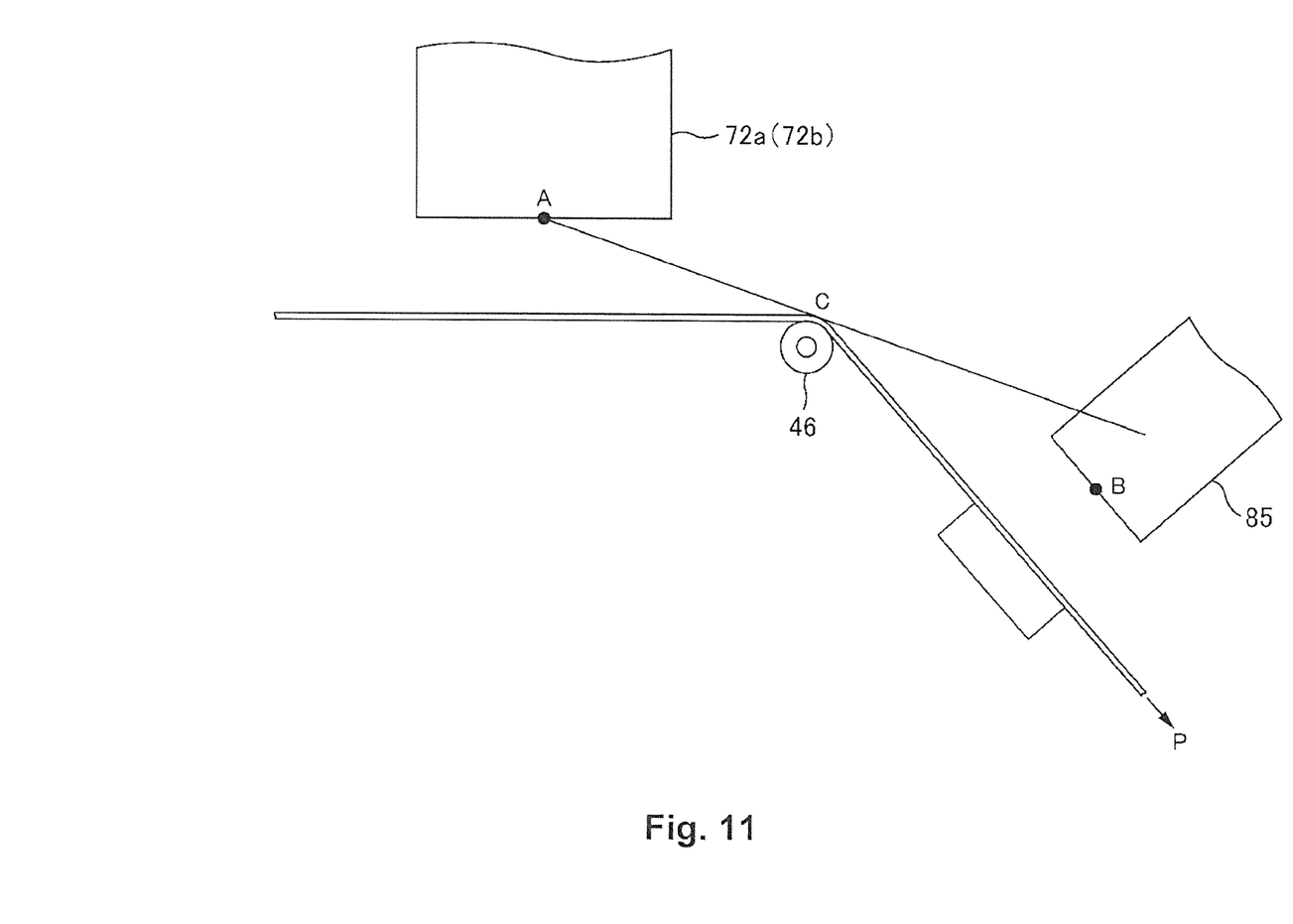
FIG. 11 is a diagram showing a positional relationship between an irradiating section 72a and a color meter 83 in a second embodiment.

FIG. 11 is a diagram showing a positional relationship between the irradiating section 72a and the color meter 83 in the second embodiment. FIG. 11 is a diagram in which a part of FIG. 10 is enlarged.

In the drawing, point A shows the position (irradiation position) of the UV light source of the irradiating section 72a (72b), and point B shows the position of the light receiving section of the color measurement head 85. Point C shows a contact point when a tangent line is drawn from point A to paper P on the peripheral surface of the bending roller 46.

In the present embodiment, the position (point B) of the light receiving section of the color measurement head 85 is arranged to be on a paper P side with respect to the above-described tangent line (line connecting point A and point C). As seen from the drawing, with this arrangement, UV radiated from the irradiating section 72a (72b) will not easily enter the light receiving section of the color measurement head 85. In sum, in the second embodiment, the irradiating section 72a (72b) and the color meter 83 are positioned such that point A, point B and point C have a relationship shown in the drawing. Consequently, the effect of UV irradiation from the irradiating section 72a (72b) will further be eliminated when the color meter 83 performs color measurement. In this manner, according to the second embodiment, the accuracy of color measurement can further be improved.

Third Embodiment

In the above-described embodiments, the print conditions (print speed and UV irradiation conditions) are the same whether or not the color meter 83 performs color measurement. In the third embodiment, however, the UV irradiation intensity of the irradiating section 72a (72b) and the print speed are changed. Incidentally, in the third embodiment, UV irradiation from the irradiating section 72a (72b) is performed at the time of calibration in the same manner as in the first embodiment.

For example, the moving speed of the carriage 51 at the time of printing is made smaller in a case where the color meter 83 performs color measurement (than in a case where the color meter 83 does not perform color measurement). Consequently, the UV irradiation intensity of the irradiating section 72a (72b) can be set to be low. In this case, although the UV irradiation intensity of the irradiating section 72a (72b) becomes low, the UV irradiation time to dots becomes long because the moving speed of the carriage 51 is made small. A UV irradiation amount ($mJ/cm^2$) is obtained by the product of UV irradiation intensity ($mW/cm^2$) and irradiation time (sec). Accordingly, even if the UV irradiation intensity is low, the UV irradiation amount to dots formed on a medium can be secured by increasing the irradiation time. Also, in this case, since the UV irradiation intensity is lowered, the effect of the UV irradiation on color measurement by the color meter 83 can be reduced. In this manner, the accuracy of color measurement can further be improved by decreasing the print speed and lowering the UV irradiation intensity.

Although the printer and the like was explained as an example, the above embodiments were described for easy understanding of the present invention, and interpretation of the present invention is not limited to the above embodiments. Needless to say, various modifications and improvements may be possible without departing from the scope of the present invention, and also the present invention covers equivalents thereof. In particular, the present invention covers the embodiments described below.

Printer

In the above embodiments, the printer was explained as an example of the liquid ejection device. However, the present invention is not limited to this. For example, similar technologies to the present embodiment can be applied to various liquid ejection devices, to which ink jet technologies are applied, such as color filter manufacturing apparatuses, dyeing apparatuses, fine processing apparatuses, semiconductor manufacturing apparatuses, surface processing apparatuses, three-dimensional modeling devices, liquid vaporization apparatuses, organic EL manufacturing apparatuses (in particular, high molecular EL manufacturing apparatuses), display manufacturing apparatuses, film forming apparatuses, or DNA chip manufacturing apparatuses.

The printer 10 of the above embodiments is a printer that alternately repeats a dot forming operation (pass) of ejecting ink from the head 61 moving in the movement direction and a feeding operation of feeding paper in the feed direction (so-called serial printer). However, the kind of the printer is not limited to this. For example, it may be possible to use a printer that includes a head having a length of a paper width and performs printing by ejecting ink from the head while feeding paper to face the head (so-called line printer). In the line printer, the head, the UV irradiating section, and the color meter are lined in the feed direction in this order. In the line printer, in order to change the print speed as in the third embodiment, the speed of feeding a medium may be changed. Specifically, the UV irradiation energy radiated to dots can be secured by decreasing the feed speed and lowering the UV irradiation intensity. Further, it is possible to prevent the accuracy of color measurement by the color meter from being deteriorated because the UV irradiation intensity is lowered.

Method for Ejecting Ink

In the above embodiments, ink is ejected by using a piezo element (piezoelectric element). However, the method for electing ink is not limited to this. For example, it may be possible to use another method such as a method in which bubbles are generated in a nozzle by heat.

Ink

In the above embodiments, ink (UV ink) to be cured by ultraviolet (UV) irradiation is ejected from the nozzle. However, a liquid ejected from the nozzle is not limited to this kind of ink. It may be possible to eject a liquid to be cured by irradiation of light other than UV (such as visible light) from the nozzle. In this case, each irradiating section may radiate light for curing the liquid (such as visible light).

UV Irradiating Section

In the above embodiments, the irradiating sections (72a, 72b) are provided on both ends of the carriage 51 in the movement direction, respectively. However, the present invention is not limited to this configuration. For example, only one of the irradiating sections 72a and the irradiating sections 72b may be provided in the carriage 51.

Calibration

In the above embodiments, calibration is performed by reading the white color of the backing 87. However, the reference color may be color other than white. For example, black may be possible.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid ejection device comprising:
   a feeding mechanism configured and arranged to feed a medium in a feed direction;
   a nozzle configured and arranged to eject a liquid to be cured by irradiation of light toward the medium in a print region;
   an irradiating section configured and arranged to radiate the light toward the liquid landed on the medium in the print region; and
   a color meter disposed in a color measurement region on a downstream side of the feed direction with respect to the print region so as to perform color measurement of an image generated on the medium, the color meter being configured and arranged such that calibration of the color meter is performed by reading a reference in the color measurement region,
   the irradiating section being configured and arranged to radiate the light in the print region while the color meter reads the reference in the color measurement region to perform the calibration of the color meter,
   the calibration of the color meter being performed in a state where a tip end of the medium is located in the print region and no liquid is ejected onto the medium.

2. The liquid ejection device according to claim 1, wherein the nozzle and the irradiating section are provided in a carriage that is configured and arranged to move in a movement direction intersecting with the feed direction, and the irradiating section is configured to radiate the light and the calibration of the color meter is performed in a state where the carriage has been moved to the print region.

3. The liquid ejection device according to claim 2, wherein the medium is fed onto the print region by the feeding mechanism when the irradiating section radiates the light.

4. The liquid ejection device according to claim 1, wherein the feeding mechanism has a bending portion provided between the irradiating section and the color meter so as to bend the medium toward a normal direction of a plane of the medium, and the color meter has a light receiving section provided in a position closer to the medium than a straight line connecting between an irradiation position where the irradiating section radiates the light and the bending portion.

5. The liquid ejection device according to claim 1, wherein a speed of printing the image on the medium is smaller and an irradiation intensity of the irradiating section is smaller when the color measurement is performed by the color meter than when the color measurement is not performed.

6. The liquid ejection device according to claim 1, wherein the color meter is configured to perform the color measurement while the liquid is being ejected by the nozzle to generate an image on the medium.

* * * * *